(12) United States Patent
Iwamura

(10) Patent No.: US 7,689,175 B2
(45) Date of Patent: Mar. 30, 2010

(54) CONFIGURABLE FREQUENCY BAND ELIMINATION FOR POWERLINE NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1146 days.

(21) Appl. No.: 11/297,214

(22) Filed: Dec. 8, 2005

(65) Prior Publication Data

US 2006/0165117 A1 Jul. 27, 2006

Related U.S. Application Data

(60) Provisional application No. 60/645,898, filed on Jan. 21, 2005.

(51) Int. Cl.
*H04B 7/00* (2006.01)
*H04M 9/00* (2006.01)

(52) U.S. Cl. .................. 455/91; 455/66.1; 455/402; 455/566; 340/310.11

(58) Field of Classification Search ............... 455/3.04, 455/3.06, 103, 114.2, 115.1, 115.4, 116, 455/402, 66.1, 566; 340/310.12–310.13, 340/310.16, 310.11, 309, 16, 309.4–309.5
See application file for complete search history.

(56) References Cited

U.S. PATENT DOCUMENTS

| 7,076,378 B1 * | 7/2006 | Huebner | 702/69 |
| 7,127,734 B1 * | 10/2006 | Amit | 725/80 |
| 7,184,428 B1 * | 2/2007 | Gerszberg et al. | 370/352 |
| 7,289,626 B2 * | 10/2007 | Carter et al. | 379/387.02 |
| 7,321,291 B2 * | 1/2008 | Gidge et al. | 375/258 |
| 7,346,332 B2 * | 3/2008 | McCarty et al. | 455/402 |
| 2003/0133473 A1 * | 7/2003 | Manis et al. | 370/480 |
| 2003/0156014 A1 * | 8/2003 | Kodama et al. | 340/310.01 |
| 2004/0057529 A1 | 3/2004 | Koga et al. | |
| 2004/0151390 A1 | 8/2004 | Iwamura | |
| 2004/0177167 A1 | 9/2004 | Iwamura et al. | |
| 2004/0184406 A1 | 9/2004 | Iwamura | |
| 2004/0208139 A1 | 10/2004 | Iwamura | |
| 2004/0224643 A1 | 11/2004 | Nakai | |
| 2004/0261101 A1 | 12/2004 | Iwamura | |

(Continued)

FOREIGN PATENT DOCUMENTS

WO WO 03/056741 A2 7/2003

OTHER PUBLICATIONS

U.S. Appl. No. 10/879,445, Iwamura.

(Continued)

*Primary Examiner*—Simon D Nguyen
(74) *Attorney, Agent, or Firm*—Miller Patent Services; Jerry A. Miller

(57) ABSTRACT

A communication device for use in adapting an appliance to a computer network consistent with certain embodiments has a data transmitter that receives data to be transmitted and generates output signals at a plurality of frequencies. A user configurable notch filter, receives the output signals from the data transmitter, for reducing the amplitude of a user selected range of frequencies, and producing a filtered output. A network communication medium interface receives the filtered output and transmitting the filtered output over a network communication medium. This abstract is not to be considered limiting, since other embodiments may deviate from the features described in this abstract.

19 Claims, 7 Drawing Sheets

U.S. PATENT DOCUMENTS

| | | |
|---|---|---|
| 2005/0008086 A1 | 1/2005 | Koga et al. |
| 2005/0015805 A1 | 1/2005 | Iwamura |
| 2005/0018766 A1 | 1/2005 | Iwamura |
| 2005/0031048 A1 | 2/2005 | Koga et al. |
| 2005/0047379 A1 | 3/2005 | Boyden et al. |
| 2005/0063355 A1 | 3/2005 | Iwamura |
| 2005/0108760 A1 | 5/2005 | Iwamura |
| 2005/0210295 A1 | 9/2005 | Iwamura |
| 2005/0249245 A1 | 11/2005 | Hazani et al. |
| 2006/0056855 A1 * | 3/2006 | Nakagawa et al. .......... 398/183 |

OTHER PUBLICATIONS

U.S. Appl. No. 11/062,647, Iwamura.

* cited by examiner

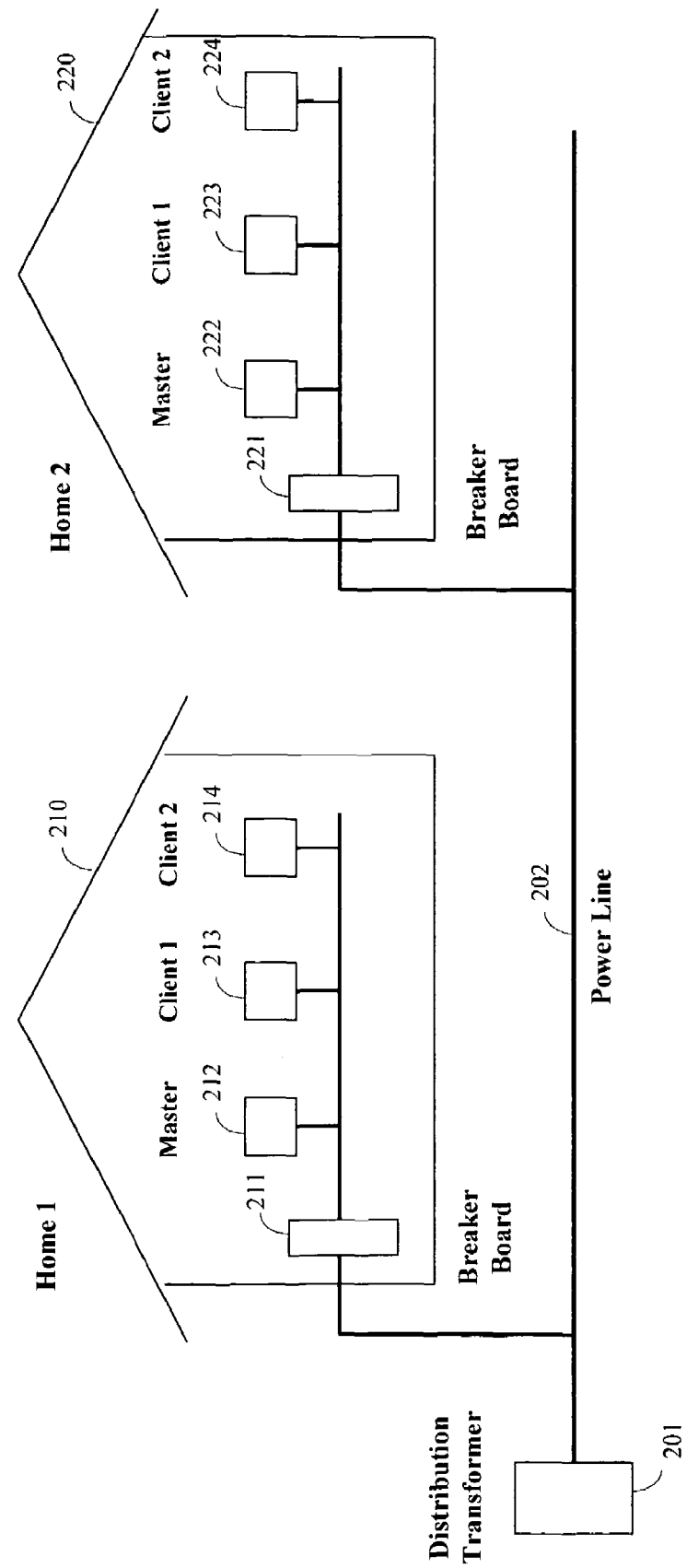

CONFIGURABLE FREQUENCY BAND ELIMINATION FOR POWERLINE NETWORK

CROSS REFERENCE TO RELATED DOCUMENTS

This application claims priority benefit of U.S. Provisional Application No. 60/645,898, filed Jan. 21, 2005, which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

In the current powerline network system (e.g., HomePlug®), the amateur radio frequency bands are eliminated by notch filters to prevent interference. However, the other frequency bands are not eliminated. Interference could occur when a user listens to, for example, a shortwave radio broadcast program. This is one of the main reasons why some shortwave radio broadcasters are opposed to use of powerline communications (PLC) networks.

The HomePlug® is a powerline network standard that is widely used in the United States of America. HomePlug® PLC networks use Orthogonal Frequency Division Multiplex (OFDM). Transmitted data are split into 70 to 80 sub-carriers spread from 1.8 to 20 MHz and sent to their destination over the power line. A power line is under very harsh condition and transmission conditions can vary every moment. For reliable transmission, the transmitter and the receiver often exchange a tone map. The receiver receives test tone signals from the transmitter and measures signal-to-noise ratio (SNR) for each sub-carrier. Based on SNR, sub-carriers and modulation schemes (ex. Binary Phase Shift Keying or Quadrature Phase Shift Keying) are selected. This sub-carrier and modulation information (tone map) is sent back to the transmitter. The transmitter performs transmission based on the tone map.

The sub-carriers that would ordinarily fall within the amateur radio bands (ex. 7, 10, 14, 18 MHz) are not used in the HomePlug® standard. Fixed notch filters are applied to these frequency bands to reduce noise emission level so as not to interfere with amateur radio communication. However, other frequency bands which are shared with other users of the spectrum may be problematic, since the PLC may generate and radiate noise in these bands which can interfere with communication. One example is shortwave radio broadcasts such as Voice of America (VOA), which uses 6.16 MHz. When a PLC network is in use, a user may have to contend with interference that inhibits the user from being able to listen to VOA broadcasts without PLC noise.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 2 illustrates how multiple homes may be interconnected in a PLC network consistent with certain embodiments of the present invention.

DETAILED DESCRIPTION

Figure 1:
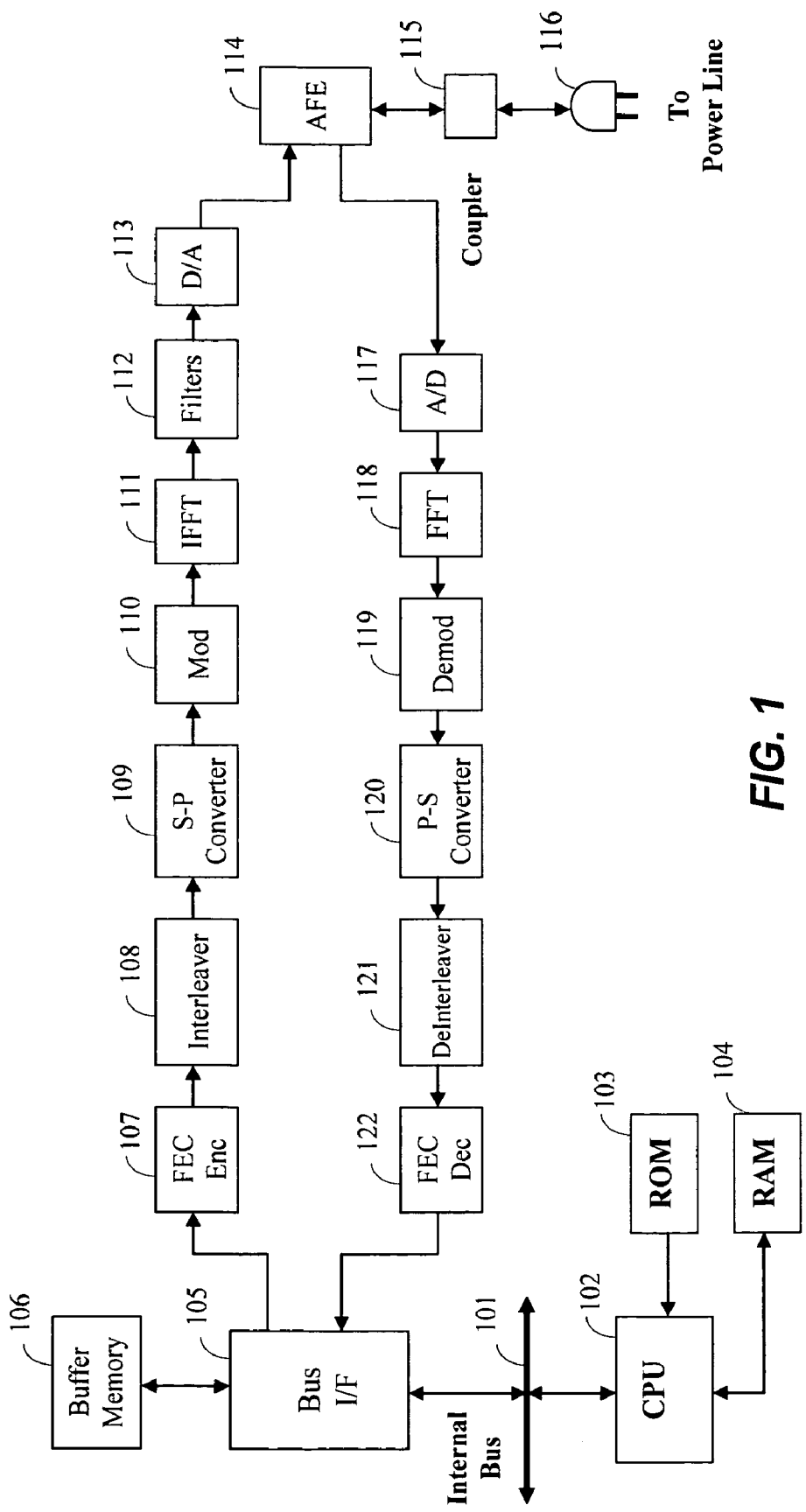
FIG. 1 is a block diagram of a PLC transceiver consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the term "power line communication network" and similar terms are intended to embrace any digital network that utilizes electrical power lines within a home, office or other structure as the communication medium used for network communication between connected devices. In particular, this term is used to encompass networks designed to use the HomePlug® network standards, current and future, which utilize spread spectrum techniques and Orthogonal Frequency Division Multiplexing (OFDM) to provide communications over the power line medium within the 1 to 30 MHz frequency band.

FIG. 1 illustrates an example block diagram of the power-line network interface. Not illustrated, but understood, is that the network interface connects to an appliance such as a personal computer or audio/video appliance in order to network such appliances. The top signal path represents a data transmission path, which in certain modes of operation represents an OFDM transmitter. Data to be transmitted over the power line are managed by a CPU 102, with associated ROM and RAM memory which interfaces with an internal bus 101. Data are received from internal bus 101 by Bus Interface 105 and temporarily stored in Buffer Memory 106. Error correction code can be added to the data read from Buffer Memory 106 in Forward Error Correction (FEC) Encoder 107. The output data from 107 are interleaved by Interleaver 108 and Serial-Parallel converted by S-P Converter 109. The parallel signals are modulated by Modulator 110 and sent to Inverse Fast Fourier Transform Block 111. In IFFT 111, the input signal is divided among available sub-carriers and inverse fast Fourier transformed. The resulting signal is passed through a user programmable notch filter 112 (along with other filtering including the fixed notch filter discussed above) sent to Analog Front End (AFE) 114 and sent via a coupler 115 to the power line through the power plug 116.

Note that embodiments consistent with the present invention can also be implemented without use of a notch filter. In such embodiments cost savings can be achieved by simply turning off the sub-carriers that are desired to be removed. In such an embodiment, no filtering needs to be performed. The configurable filter of component 112 is not required. In this embodiment, however, there may be some side lobe interference. This interference can be reduced by eliminating more adjacent sub-carrier(s). Alternatively, both filtering and turning off of sub-carriers can be utilized.

It should also be noted that other embodiments consistent with the present invention may use a reduction in amplitude of the interfering carriers rather than fully turning off the sub-carriers. This can be accomplished with or without notch filtering per-se, for example, by controlling the gain of an amplifier. Use of the term "attenuate" herein may, therefore, be interpreted to mean either a reduction in an existing output, or alternatively, a reduction in gain to effectively reduce an amplitude over that which would normally be produced.

Hence, the term "notch filtering" and related terms as used herein, can be interpreted to mean actual digital or analog filtering of existing signals to reduce the signal levels of certain "notched out" frequencies. However, the term can further be used in a broader sense to mean that carriers in particular ranges of frequencies are simply omitted, not generated, turned off, not used or reduced in power. In certain embodiments, this can be effected using conventional tone map exchange or other mechanisms including use of notch messages as will be described later. In any case, carriers within the frequency bands selected by the user can be reduced. In the embodiment described above, a configurable filter 112 is used to effect this reduction in carriers, but in the alternative (or in addition to variations in configurable filter 112) the carriers can be omitted or reduced in amplitude under control of CPU 102.

The lower half blocks of FIG. 1 are used for data reception. The input data are processed in a reversed manner as the processing used for transmission. AFE 114 receives a data stream from the client through coupler 115 over the power line. The received data are fast-Fourier-transformed by FFT 118, demodulated by Demodulator 119 and parallel-serial converted by P-S converter 120. The result is de-interleaved by De-interleaver 121, error-corrected by FEC decoder 122 and sent to Bus Interface 105. The data are again temporarily stored in Buffer Memory 106 and then sent to the internal bus 101. The PLC Interface described simultaneously handles transmission and reception of data.

Thus, PLC interface consistent with certain embodiments has a transmit signal path having an error correction encoder receiving digital input and producing an output. A data interleaver receives the output of the error correction encoder to produce interleaved data. A serial to parallel converter converts the interleaved data to parallel data. A modulator modulates the parallel data using selected modulation methods. The best modulation is selected for each sub-carrier. An inverse Fast Fourier Transformer transforms the modulated data. A user configured notch filter filters user configured frequency bands out of the transformed modulated data. An interface couples the transformed data onto a power line.

The power line interface further has a receive signal path having an interface for receiving data from a power line. A Fast Fourier Transformer Fast Fourier transforms data received over the power line. A parallel to serial converter converts the transformed data to serial format. A de-interleaver de-interleaves the serial format data. A forward error correction decoder error corrects the serial format data.

In operation, a notch filter in 112 is user programmed to notch out frequency bands that might cause problematic interference. Transmission data are sent to Bus Interface 105 through the internal bus 101 and temporarily stored in Buffer Memory 106 if necessary. Then, the data is sent to Forward Error Correction Encoder 107 and FEC code is added. The result is interleaved in Interleaver 108 and serial-to-parallel converted in S-P converter 109. The parallel outputs are modulated in Modulator 110 and inverse fast Fourier transformed in IFFT 111. Note that only available sub-carriers are used here as defined by the tone map. Also, the sub-carriers in any band which is designated as eliminated are not used. The user specifies a frequency band to eliminate at filter 112 (for example, 6.0 to 6.3 MHz) using any suitable graphic user interface. In this example, the sub-carriers that exist in the example band of 6.0-6.3 MHz are not used.

The IFFT transformed signal is notch-filtered in Filters block 112. Here, the amateur radio bands and the user specified band(s) will be eliminated by the notch filters. The notch filter for the user specified band is configurable. For the above example, the notch filter is configured to eliminate 6.0-6.3 MHz. The notch filter is, for example, a digital finite impulse response (FIR) filter. The number of the delay units and the weighting coefficients determines filtering characteristics. By changing these parameters, the specified frequency band will be notched out.

The filtered result is digital-to-analog converted in D/A 113 and sent to Analog Frontend 114. The output of AFE 114 is sent to the power line through Coupler 115. Coupler 115 passes only high frequency signals from 1 to 30 MHz.

Incoming data from the power line are sent to AFE 114 through Coupler 115. The output of AFE 114 is analog-to-digital converted in A/D 117 and fast Fourier transformed in FFT 118. The FFT transformed sub-carriers are demodulated in Demodulator 119 and parallel-to-serial converted in P-S Converter 120. The result is de-interleaved in Deinterleaver 121 and error-corrected in FEC decoder 122. The result is sent to Bus Interface 105, temporarily stored in Buffer Memory 106 if necessary and sent to the internal bus 101.

CPU 102 executes software programs stored in Read Only Memory 103 using Random Access Memory 104. CPU 102 controls all of the functional blocks in FIG. 1 including the filter 112. The parameters of the filter 112 are established based upon user input from any suitable user interface.

Thus, in accordance with certain embodiments, a communication device for use in adapting an appliance to a computer network has a data transmitter that receives data to be transmitted and generates output signals at a plurality of frequencies. A user configurable notch filter, receives the output signals from the data transmitter, for reducing the amplitude of a user selected range of frequencies, and producing a filtered output. A network communication medium interface receives the filtered output and transmitting the filtered output over a network communication medium.

In another embodiment, a power line communication (PLC) device for use in adapting an appliance to a PLC computer network has a PLC data transmitter that receives data to be transmitted and generates output signals at a plurality of frequencies. A user configurable notch filter, receives the output signals from the data transmitter, for reducing the amplitude of a user selected range of frequencies, and produces a filtered output. A PLC interface receives the filtered output and transmits the filtered output over the power line.

As shown in FIG. 2, several homes generally share a single power line. Each home has one or more logical powerline networks. In home 210, a network includes network nodes 212 and 213 which are connected together by the power line. The information on the network, thus, is passed via breaker board 211 to the distribution transformer 201 that services both home 210 and 220 via power line 202. At home 220, network devices 222 and 223 are coupled together via the power line and coupled to the distribution transformer via breaker board 221 and power line 202. Hence, the devices in home 210 and 220 may produce data that must share the same power line, and thus, has the potential to cause interference in more than one home.

The devices in the same logical network share unique encryption keys so that no other logical network can access to them. However, since the power line is physically shared with neighbors there is a possibility that a neighbor's power line network may cause undesirable interference. Even if some frequencies are completely notched out in the logical network, a neighbor might still cause interference.

In accordance with certain embodiments consistent with the present system, this problem can be avoided. When the user sets a notch frequency band for his own network, a notch request is generated by CPU 102 under computer program control and is broadcast via the transmitter to all devices in both his network and the neighbor networks. The notch request is not encrypted so that all the devices can read it. The notch request includes information on sub-carriers to eliminate and may also include time periods for elimination of those sub-carriers. Based on the notch request, each device eliminates the specified sub-carrier(s) and notches out the frequency band(s) during the specified time period. Note that since only a few sub-carries are eliminated, notch requests cause only a minimal impact to the total network bandwidth and thus throughput.

Since some shortwave radio stations change broadcast frequencies several times in a day, certain embodiments allow the user to set a time period for each notch band. For example, 4.0-6.2 MHz band can be notched from 8:00 AM to 10:00 PM and the 4.8-5.0 MHz band can be notched from 6:00 PM to 10:00 PM. Sub-carrier elimination and notch filtering will be automatically performed as the user sets. The user does not have to configure a frequency band every time the broadcast frequency is switched.

Figure 4:
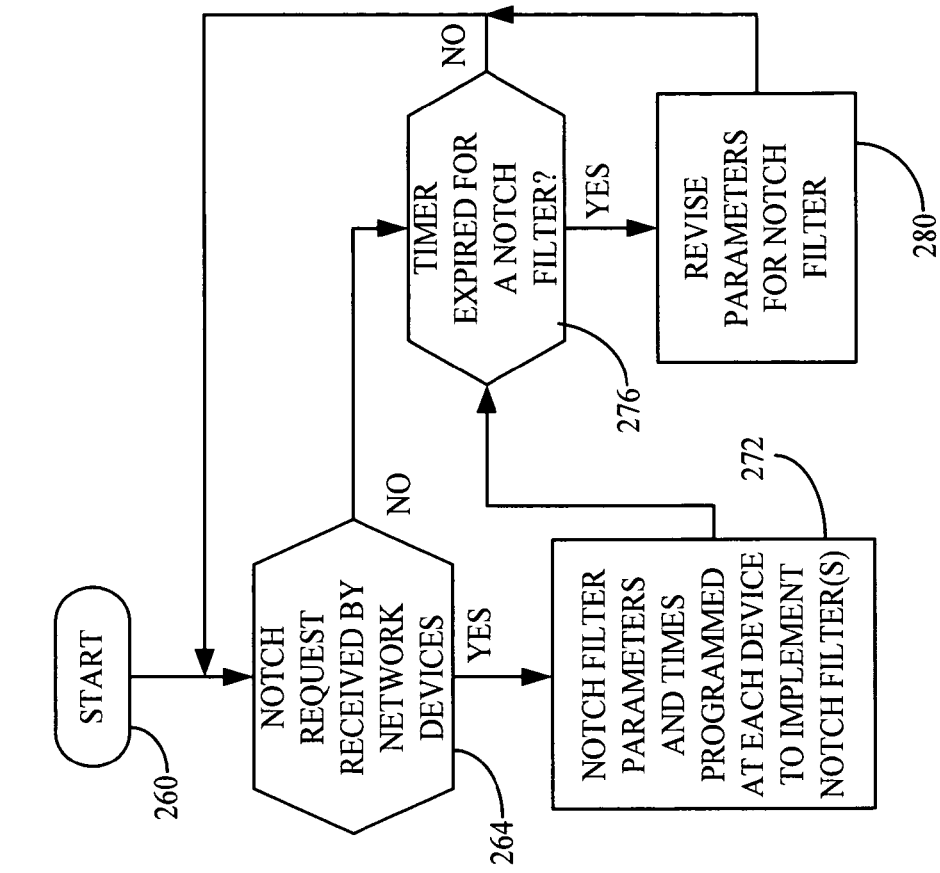
FIG. 4 is a flow chart of a notch filter configuration process as carried out at a network device in response to a notch filter request message consistent with certain embodiments of the present invention.
Figure 3:
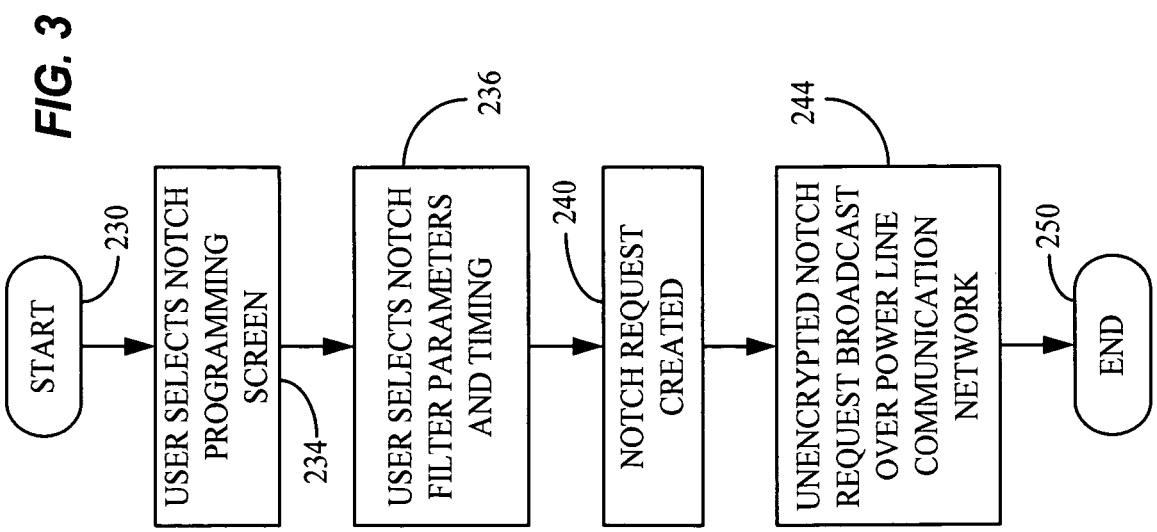
FIG. 3 is a flow chart of a notch filter configuration process for an exemplary notch filter consistent with certain embodiments of the present invention.

The above process is outlined in the flow charts of FIGS. 3 and 4. The frequency bands illustrated in this example are for illustrative purposes only, and can be configured to program notch filters for any suitable band of frequencies. Moreover, the examples illustrate selection of a center frequency of the band, but could equally well use starting and ending frequencies as well as band names (e.g., VOA, shortwave, etc.) without limitation.

The process of FIG. 3 starts at 230 after which the user selects a notch programming screen. The notch programming screen may be selected via, for example, a personal computer connected to the power line communication network using a browser or other software to address a designated IP address which brings up various control functions including the notch filter programming screen. At 236, the user selects a notch filter along with its parameters and associated timing to be implemented in the PLC network. The PLC network device then creates a notch request message at 240. The unencrypted notch request message is broadcast over the PLC communication network at 244, and the process ends at 250.

An exemplary, but non-limiting, process undertaken by the network devices is depicted in the flow chart of FIG. 4 starting at 260. At 264, the process determines if a notch request message has been received by the network device. If so, the notch request is processed and notch filter parameters and times are programmed at the recipient device to implement the notch filter or filters at 272. Control then passes to 276 where the device determines if a timer has expired for a notch filter. If so, the notch filter parameters are revised at 280, and the process returns to 264. If no timer has expired for the notch filter, the process also returns to 264. At 264, if a notch request is not received by the network device, control passes to 276 where the timers are again inspected.

Referring back to FIG. 2 consider an application example for a notch request. This is a master-client system in this example. Each logical network (home network) has a master device (212 and 222). The master device assigns time (and/or frequency) bandwidth to a client on demand. For example, if client 1 (213) is going to send an audio/video stream to client 2 (214), Client 1 (213) asks the master 212 and obtains enough bandwidth for the stream. Then, Client 1 (213) starts sending the stream to client 2 (214); If not enough bandwidth is available, the master 212 rejects the request from the client (213). When the master 212 reserves bandwidth, it communicates with the neighbor master 222. The neighbor master 222 may reject the bandwidth request from the master 212 with some reason. For example, when the neighbor master 222 is about to start another communication that has higher priority, the neighbor master 222 may refuse the request from the master 212.

The user specifies OFDM sub-carriers to notch out at Client 1 (213). Client 1 (213) sends a notch request to the master 212. If the request is accepted, the master sends a notch command to all the clients (213 and 214). If not, the master sends a rejection back to the client. As a result of accepting the request, the clients notch out the specified sub-carriers on the fly (i.e., dynamically). When both devices receive the command, the specified sub-carriers will be turned off. Note that available sub-carriers vary at every moment. The transmitter and the receiver often (periodically) exchange a tone map to adapt channel condition. Sub-carriers are turned on and off in the normal course of operation of the system, thus, no special mechanism is required for notch out. The master 212 also sends the notch command to the neighbor master 222. The neighbor master 222 similarly forwards the command to all the clients in the same logical network (223 and 224). The same sub-carriers will be notched out also in the neighbor network. This reduces interference from the he neighbor network. The client 223 and 224 may receive the command directly from the master 212, not by way of the master 222.

Therefore, in accordance with certain embodiments, the term "notch" and "notch filter" as used herein can be interpreted to mean that certain ranges of frequencies are simply turned off by using the tone map in order to implement the notching function. In these example systems, an actual filter may or may not be used, but the carriers within a range selected by a user are suppressed by virtue of the system accepting a user command to avoid use of carriers falling within a user selected range of frequencies. Such variants are considered to be equivalent to filtering whether or not filtering is actually used to suppress signals in a particular frequency range.

Thus, a communication device for use in adapting an appliance to a computer network has a data transmitter that receives data to be transmitted and generates output signals at a plurality of frequencies. A user interface is provided for specifying ranges of frequencies that should not be transmitted. A user configurable notching mechanism controls the plurality of output frequencies in response to the user interface. Hence, each of the variants described herein can be implemented using direct control of which carriers are used rather than, on in addition to actual filtering at filter 112.

In accordance with certain embodiments, rules may be applied to limit sub-carrier notch out:

(1) Each logical network may notch out up to X1% of the whole bandwidth For example, the max limit X1 can be selected to be, for example, 3%. If the total number of sub-carriers number is 1000, 30 or fewer sub-carriers can be turned off. This rule is applied any time.

(2) When the total bandwidth usage is less than Y %, each logical network may notch out up to X2%. For example, assume that Y is 80% and X2 is 7%. When the network gets busy and the bandwidth usage exceeds 75%, notched-out sub-carriers will be limited to X1 (%). Some sub-carriers, maybe notched most recently will be turned on.

(3) A time limit may be set. For example, notch out is valid only for 2 hours. After that, notched-out sub-carriers will be limited to X1 (%) again.

Hence, rules may be imposed that specify that activation of the user configurable notch filter is limited to one or more of the following: a specified duration of time; a specified number of sub-carriers and a specified percentage of available bandwidth. Other variants will occur to those skilled in the art upon consideration of the present teachings.

Figure 5:
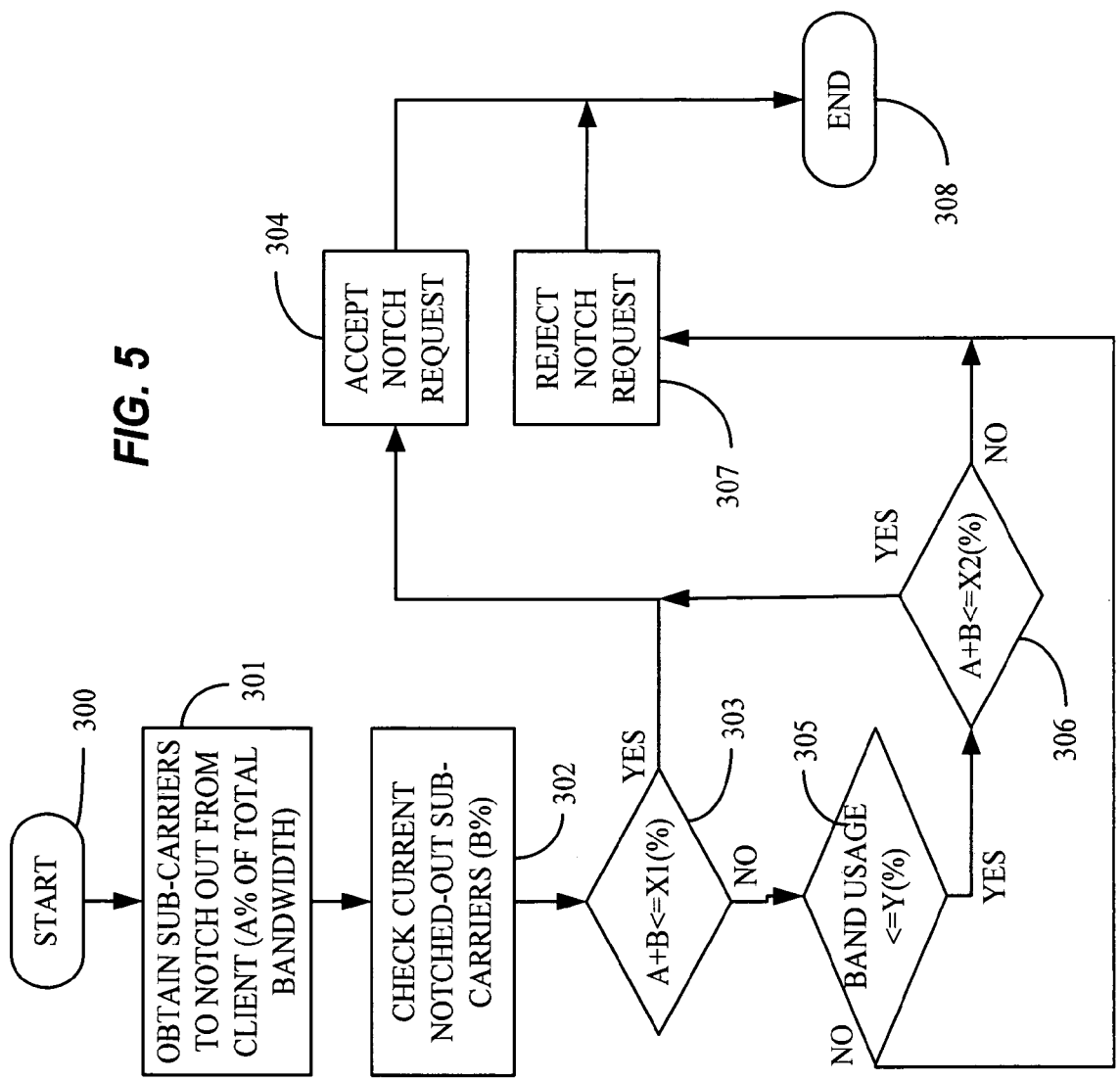
FIG. 5 is a flow chart of a first example of a notch filter control algorithm consistent with certain embodiments of the present invention.

FIG. 5 depicts an exemplary algorithm for operation of the master device. When the master receives a notch out request from a client, the process starts with 300. At the 301, the master obtains the sub-carriers to notch out and calculates what percentages of the total sub-carriers they are (A %). At 302, it is checked what percentages of the total sub-carriers is already notched out by the master (B %). At the branch 303, A+B is compared with X1 (%), which is the maximum limit of notch-out sub-carriers. If A+B is equal to or less than X1, 304 is executed. The master accepts the notch request and returns a notch command to each client. The master also sends the command to the neighbor master. The process ends at 308.

If A+B is larger than X1 at the branch 303, the branch 305 is executed. If the total band usage is equal to or less than Y %, the branch 306 is executed. At the branch 306, A+B is compared with X2 (%), which is the second limit. If A+B is equal to or less than X2, 304 will be executed. At the branch 305, if the band usage is larger than Y, 307 will be executed. Also, at the branch 306, if A+B is large than X2, 307 will be executed.

At 307, the master returns a reject message to the client who sent the notch out request. In this case, no sub-carrier is turned off.

Figure 6:
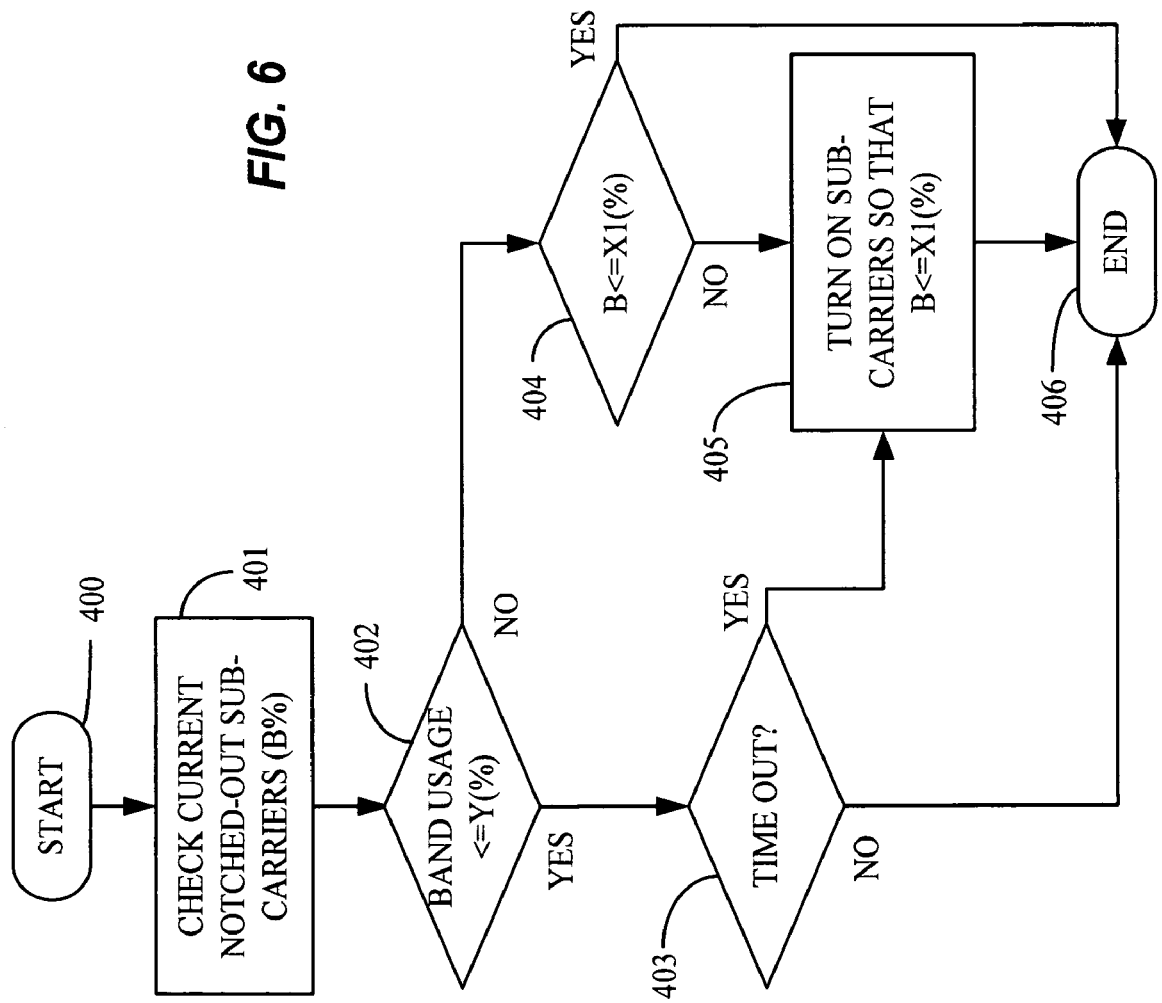
FIG. 6 is a flow chart of a second example of a notch filter control algorithm consistent with certain embodiments of the present invention.

FIG. 6 shows another exemplary algorithm for the master device. This algorithm is often (periodically) executed by the master to watch the bandwidth usage. If the bandwidth usage exceeds Y (%), notched-out sub-carriers will be limited up to X1 (%). The process starts with 400. At 401, the process checks what percentage of sub-carriers are already notched out (B %). At the next branch 402, the total band usage is compared with Y (%). If it is equal to or less than Y, the branch 403 is executed. If it is not time out, nothing is executed and the process ends at 406. If a time out has occurred at 403, 405 is executed. Here, some sub-carriers will be turned on so that B will not exceed X1. At the branch 402, if the band usage exceeds Y, the branch 404 will be executed. If B is equal to or less than X1, the process ends at 406. If not, 405 will be executed and B will be increased up to the limit X1.

With this algorithm, notched out sub-carriers can be adaptively controlled. Each master can always notch out the minimum number of sub-carriers (X1 %). When the network is not busy, extra sub-carriers can be notched. When the network gets busy, notched-out sub-carriers will be limited up to X1 again.

Figure 7:
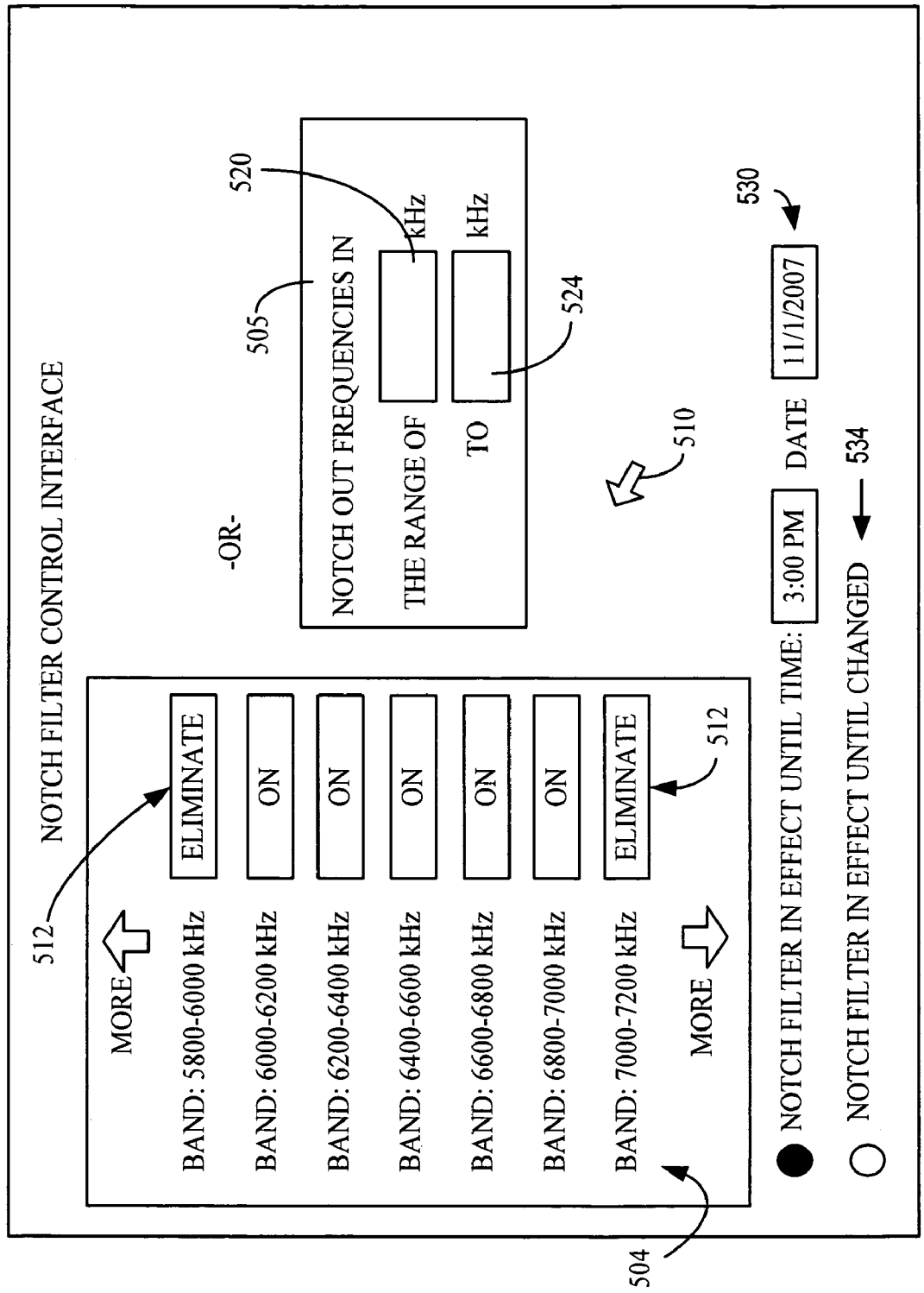
FIG. 7 is an illustration of an exemplary notch filter interface screen consistent with certain embodiments of the present invention.

Any suitable user interface can be utilized to configure the notch filter or filters consistent with embodiments of the present invention. User interface screen 500 of FIG. 7 is illustrative of an exemplary notch filter control interface, but should not be considered limiting. In this example, either of two mechanisms can be utilized to program the notch filters. Window 504 can be used to simply click on various bands of notch filters to either turn notch filters centered at those bands on or off. This is accomplished by moving a cursor 510 over a software button displayed on the display as button 512. When the user clicks a mouse or other pointing device with the cursor on one of button 512, the notch filter is toggled between the on state (frequencies eliminated) and the off state (frequencies used). In this example, frequency bands can be eliminated in 200 kHz increments, but this should not be considered limiting. Further ranges of frequencies can be revealed by clicking on the "more" arrows to implement a conventional scrolling action. As an alternative, a user may directly enter notch frequencies in a specified range using window 505 where a starting frequency of a frequency range is entered at 520 and an ending frequency is entered at 524 to establish a range of carriers that will be notched out by the notch filter.

In this example, if one wishes to avoid interference with the Voice of America (at 6.16 MHz), the band between 6000 and 6200 kHz can be notched out. If interference persists, it is likely the result of side lobe interference, so additional adjacent bands can also be notched out.

In accordance with certain embodiments, the user may select specified time periods for the implementation of a notch filtering scheme. In one embodiment, as depicted in interface 500, a user can select at 530 and the ending time for the configuration of the notch filter is selected along with an ending date for the notch filter selected. Alternatively, the user can determine that the notch filters are to remain in effect until changed at 534.

Figure 8:
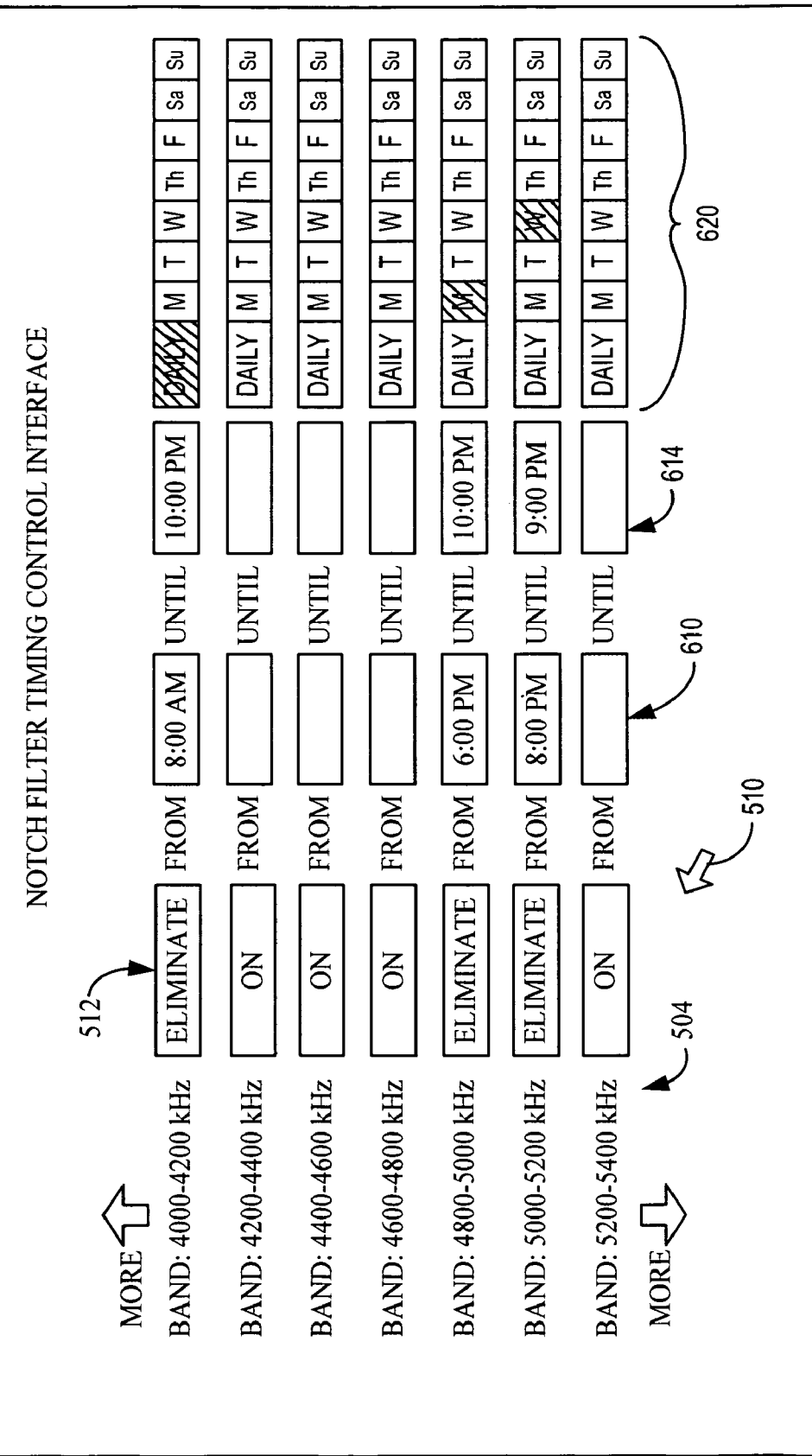
FIG. 8 is another illustration of an exemplary notch filter and timing interface screen consistent with certain embodiments of the present invention.

In another exemplary embodiment, depicted as user interface 600 of FIG. 8, each individual notch filter can be programmed by time of day and day of week. In this example, the bands 504 can be selected with button 512 in the same manner previously described. However, at 610, a starting time can be selected, and at 614, an ending time can be selected for the notch filter. Moreover, at 620, the user can individually select one or more days of the week in which the notch filter is to be active or can select that the notch filter is to be active daily. As in the previous example, frequency bands can be eliminated in 200 kHz increments, but this should not be considered limiting. Further ranges of frequencies can be revealed by clicking on the "more" arrows to implement a conventional scrolling action.

Thus, a method consistent with certain embodiments involves receiving an input from a user via a user interface for configuring a user configurable notch filter; generating a first notch filter configuration request message specifying notch filter configuration parameters established using the user input; and transmitting the first notch configuration request message over a power line to a power line communication (PLC) device in order to configure a transmitter notch filter at the power line communication (PLC) device.

In certain embodiments, the method further involves receiving a second notch configuration request message transmitted over the power line specifying notch filter parameters, configuring a configurable notch filter in accordance with the specified notch filter configuration parameters received in the notch filter configuration request message. In certain embodiments, the user interface is adapted to permit the user to select a frequency band to be attenuated by the user configurable notch filter, and wherein the user interface is further adapted to permit the user to select a time for deactivation of the attenuation of the selected frequency band. In certain embodiments, the user interface is adapted to permit the user to select a frequency band to be attenuated by the user configurable notch filter, and wherein the user interface is further adapted to permit the user to select a time for activation of the attenuation of the selected frequency band. In certain embodiments, the user interface is adapted to permit the user to select a frequency band to be attenuated by the user configurable notch filter, and wherein the user interface is further adapted to permit the user to select at least one day of the week for activation and deactivation of the attenuation of the selected frequency band.

The user programmable notch filters (or equivalent carrier reduction techniques as described) consistent with certain embodiments of the present invention attenuate the transmitted signal in the user selected bands. The level of attenuation should be selected to be adequate to inhibit generation of interference at the selected frequencies. In certain embodiments, attenuation on the order of 25 dB or greater in selected notched out bands should prove adequate for most applications, but this should not be considered limiting, and the closer to ideal the notch filter operates, the better.

Thus, in accordance with certain embodiments, the user can specify a frequency band to eliminate. The sub-carriers in the specified band are not used. The configurable notch filter eliminates the specified band and reduces noise emission level. The user can specify a time period to activate the elimination. A notch request is broadcast to the other devices to ask to eliminate the frequency band.

While the above embodiments described in connection with FIGS. 7-8 provide a mechanism for selection of specific times, dates, days of the week, and frequency bands for notching, these interfaces should be only considered as illustrative, and not limiting. One of ordinary skill in the art will appreciate, upon consideration of the present teaching, that any suitable mechanism can be used to permit the user to enter start times, ending times, time ranges, days, dates, day or date ranges, days of the week, etc. for implementing the notch filtering or equivalent techniques for suppression of carriers.

In certain embodiments, it is preferred, but not necessary that a blocking filter be installed to the breaker board to isolate the in-home network from the neighbors. In such an embodiment, no signal goes out and no signal comes in. The blocking filter drastically reduces interference from the neighbors. The blocking filter helps frequency band elimination. In addition, although this notch filtering is described in connection with a PLC network, it could be applied to other networks as well, for example, an 802.11 wireless network, in which a similar notch filter configuration is used to prevent transmission over frequencies that would produce undesired interference with other communications.

While certain embodiments herein were described in conjunction with specific circuitry (e.g., programmable filter 112) that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A communication device for use in adapting an appliance to a computer network, comprising:
    a data transmitter that receives data to be transmitted and generates output signals at a plurality of frequencies;
    a user configurable notch filter, receiving the output signals from the data transmitter, for reducing the amplitude of a user selected range of frequencies, and producing a filtered output, wherein the user configurable notch filter is configured via a user interface, wherein the user interface is adapted to permit the user to select a frequency band to be attenuated by the user configurable notch filter, and wherein the user interface is further adapted to permit the user to select at least one day of the week for activation and deactivation of the attenuation of the selected frequency band for at least a portion of the selected day; and
    a network communication medium interface receiving the filtered output and transmitting the filtered output over a network communication medium.

2. The communication device in accordance with claim 1, wherein the data transmitter comprises an orthogonal frequency division multiplexing transmitter.

3. The communication device in accordance with claim 1, wherein the communication medium comprises a power line and the data transmitter comprises a power line communications (PLC) transmitter.

4. The communication device in accordance with claim 1, wherein the user configurable notch filter is configured via a user interface, wherein the user interface is adapted to permit the user to select a frequency band to be attenuated by the user configurable notch filter, and wherein the user interface is further adapted to permit the user to select a time for deactivation of the attenuation of the selected frequency band.

5. The communication device in accordance with claim 1, wherein the user configurable notch filter is configured via a user interface, wherein the user interface is adapted to permit the user to select a frequency band to be attenuated by the user configurable notch filter, and wherein the user interface is further adapted to permit the user to select a time for activation of the attenuation of the selected frequency band.

6. The communication device in accordance with claim 1, further comprising means for generating a notch filter configuration request message specifying notch filter configuration parameters and transmitting the notch configuration request using the data transmitter.

7. The communication device in accordance with claim 1, further comprising a receiver that receives a notch configuration request message specifying notch filter parameters, and means for configuring the user configurable notch filter in accordance with the specified notch filter configuration parameters received in the notch filter configuration request message.

8. The communication device in accordance with claim 1, wherein activation of the user configurable notch filter is limited to at least one of the following: a specified duration of time; a specified number of sub-carriers and a specified percentage of available bandwidth.

9. A power line communication (PLC) device for use in adapting an appliance to a PLC computer network, comprising:
- a PLC data transmitter that receives data to be transmitted and generates output signals at a plurality of frequencies;
- a user configurable notch filter, receiving the output signals from the data transmitter, for reducing the amplitude of a user selected range of frequencies, and producing a filtered output wherein the user configurable notch filter is configured via a user interface, wherein the user interface is adapted to permit the user to select a frequency band to be attenuated by the user configurable notch filter, and wherein the user interface is further adapted to permit the user to select at least one day of the week for activation and deactivation of the attenuation of the selected frequency band for at least a portion of the selected day; and
- a PLC interface receiving the filtered output and transmitting the filtered output over the power line.

10. The power line communication (PLC) device in accordance with claim 9, wherein the user configurable notch filter is configured via a user interface, wherein the user interface is adapted to permit the user to select a frequency band to be attenuated by the user configurable notch filter, and wherein the user interface is further adapted to permit the user to select a time for deactivation of the attenuation of the selected frequency band.

11. The power line communication (PLC) device in accordance with claim 9, wherein the user configurable notch filter is configured via a user interface, wherein the user interface is adapted to permit the user to select a frequency band to be attenuated by the user configurable notch filter, and wherein the user interface is further adapted to permit the user to select a time for activation of the attenuation of the selected frequency band.

12. The power line communication (PLC) device in accordance with claim 11, wherein activation of the user configurable notch filter is limited to at least one of the following: a specified duration of time; a specified number of sub-carriers and a specified percentage of available bandwidth.

13. The power line communication (PLC) device in accordance with claim 9, further comprising means for generating a notch filter configuration request message specifying notch filter configuration parameters and transmitting the notch configuration request using the data transmitter.

14. The power line communication (PLC) device in accordance with claim 9, further comprising a receiver that receives a notch configuration request message specifying notch filter parameters, and means for configuring the user configurable notch filter in accordance with the specified notch filter configuration parameters received in the notch filter configuration request message.

15. A method, comprising:
- receiving an input from a user via a user interface for configuring a user configurable notch filter;
- generating a first notch filter configuration request message specifying notch filter configuration parameters established using the user input; and
- transmitting the first notch configuration request message over a power line to a power line communication (PLC) device in order to configure a transmitter notch filter at the power line communication (PLC) device,
- wherein the user interface is adapted to permit the user to select a frequency band to be attenuated by the user configurable notch filter, and wherein the user interface is further adapted to permit the user to select at least one day of the week for activation and deactivation of the attenuation of the selected frequency band for at least a portion of the selected day.

16. The method in accordance with claim 15, further comprising receiving a second notch configuration request message transmitted over the power line specifying notch filter parameters, configuring a configurable notch filter in accordance with the specified notch filter configuration parameters received in the notch filter configuration request message.

17. The method in accordance with claim 15, wherein the user interface is adapted to permit the user to select a frequency band to be attenuated by the user configurable notch filter, and wherein the user interface is further adapted to permit the user to select a time for deactivation of the attenuation of the selected frequency band.

18. The method in accordance with claim 15, wherein the user interface is adapted to permit the user to select a frequency band to be attenuated by the user configurable notch filter, and wherein the user interface is further adapted to permit the user to select a time for activation of the attenuation of the selected frequency band.

19. The method in accordance with claim 15, wherein activation of the user configurable notch filter is limited to at least one of the following: a specified duration of time; a specified number of sub-carriers and a specified percentage of available bandwidth.

* * * * *